(12) United States Patent
Iimura et al.

(10) Patent No.: US 6,695,505 B2
(45) Date of Patent: Feb. 24, 2004

(54) BACKLASH CORRECTION DEVICE AND BACKLASH CORRECTION METHOD

(75) Inventors: Naoyuki Iimura, Ibaraki-ken (JP); Hideharu Yoneoka, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 454 days.

(21) Appl. No.: 09/753,687

(22) Filed: Jan. 4, 2001

(65) Prior Publication Data
US 2001/0008597 A1 Jul. 19, 2001

(30) Foreign Application Priority Data
Jan. 13, 2000 (JP) ..................... P2000-004995

(51) Int. Cl.[7] .......................... B41J 13/02; F16H 55/18
(52) U.S. Cl. .................. 400/636.2; 74/409; 74/440
(58) Field of Search .............. 400/636.2, 637.1, 400/645.3, 647, 591, 593, 596, 607.1, 610.1, 610.4, 633.1, 633.2, 642, 271, 578, 624, 625, 636, 582; 74/409, 440

(56) References Cited

U.S. PATENT DOCUMENTS

| | | | | |
|---|---|---|---|---|
| 4,269,522 A | * | 5/1981 | Levinson et al. | 400/616.1 |
| 4,930,916 A | * | 6/1990 | Fujiwara | 400/636 |
| 5,308,176 A | * | 5/1994 | Yamaguchi | 400/618 |
| 6,183,151 B1 | * | 2/2001 | Kono | 400/582 |
| 6,244,767 B1 | * | 6/2001 | Jung | 400/636.2 |

* cited by examiner

Primary Examiner—Andrew H. Hirshfeld
Assistant Examiner—Houi-An D. Nguyen
(74) Attorney, Agent, or Firm—Nath & Associates PLLC; Gary M. Nath; Marvin C. Berkowitz

(57) ABSTRACT

A backlash correction device of this invention has a motor, a gear transmitting a moving force from the motor to a paper feed base, a spring urging the paper feed base to one of forward and backward movement directions of the paper feed base using an urging force, and a controller. (1) If the paper feed base is moved in an opposite direction to an urging direction of the spring, the controller drives the motor in a movement direction of the paper feed base by a predetermined movement quantity. (2) If the paper feed base is moved in a same direction as the urging direction of the spring, the controller (2-1) drives the motor in a movement direction of the paper feed base by a movement quantity which is the sum of the predetermined movement quantity and a correction quantity equal to or greater than a maximum backlash quantity, and (2-2) then drives the motor in an opposite direction by the correction quantity.

4 Claims, 6 Drawing Sheets

BACKLASH CORRECTION DEVICE AND BACKLASH CORRECTION METHOD

CROSS-REFERENCE TO RELATED APPLICATION

This application is based upon and claims the benefit of priority from the prior Japanese Patent Application No. 2000-4995, filed Jan. 13, 2000; the entire contents of which are incorporated herein by reference.

BACKGROUND OF THE INVENTION

1. Field of the Invention

The present invention relates to a backlash correction device and a backlash correction method for preventing the backlash of gears by exerting an urging force to a mobile body moving in forward and backward directions, to one direction.

2. Description of the Related Art

Various types of devices for transmitting a moving force from a driving source to a mobile body through a moving force transmission means having gears allow urging means, such as a spring, to act on the mobile body in one movement direction so as to prevent the erroneous movement of the mobile body due to the backlash of the gears. The specific example of this conventional backlash correction device will be described with reference to FIGS. 1 to 4.

FIG. 1 is a plane view of a paper feed device of a printer or the like to which a backlash correction device is applied. An elevator 1 is vertically, movably provided at a main body base (not shown) and vertically moved by the driving force of an elevator M1. A paper feed base 2, which is a mobile body, is laterally, slidably provided at the elevator 1 by being guided by a guide rail 3. The elevator 1 is provided with a lateral movement motor M2 serving as a driving source and driving force transmission means 4 for transmitting the driving force of this lateral movement motor M2 to the paper feed base 2. The driving force transmission means 4 consists of the first gear G1 fixed to the shaft of the lateral movement motor M2, the second gear G2 engaged with the first gear G1, the third gear G3 engaged with the second gear G2, the fourth gear G4 engaged with the third gear G3 and a rack gear G5 engaged with the fourth gear G4 and fixed to the paper feed base 2.

An extension spring 5 serving as urging means, is provided between the paper feed base 2 and the elevator 1. The paper feed base 2 is urged by the spring force of the extension spring 5 to one direction (which is a left direction in FIG. 1) of the forward and backward movement directions of the base 2. In FIG. 1, reference symbol S1 denotes a lateral HP (home position) sensor detecting the home position of the paper feed base 2. The lateral correction position of the paper feed base 2 is adjusted based on the home position detected by the lateral HP (home position) sensor S1. Reference symbol S2 denotes a paper sensor detecting whether or not paper is present on the paper feed base.

Next, the function of the backlash correction device constituted as stated above will be described. Since the positional relationship among the gears G1 to G5 is relatively determined, description will be given while assuming that each motor-side gears is Ga and each paper feed base-side gear is Gb. As shown in, for example, FIG. 2, the gears Ga and Gb are applied with the spring force f1 of the extension spring 5 and always engaged with each other on their one engagement faces 6a and 7a. In this state, if the paper feed base 2 is moved in an opposite direction to the urging direction of the extension spring 5, the lateral movement motor M2 is driven from the state of FIG. 3(A) to the movement direction of the paper feed base 2 by a predetermined movement quantity. Since the driving force is transmitted in a direction resisting the spring force f1 of the extension spring 5 as shown in FIG. 3(B), the lateral movement motor-side gear Ga and the paper feed base-side gear are engaged with each other on their one engagement faces 6a and 7a and a rotation force is thereby transmitted to the paper feed base 2. Therefore, when the paper feed base 2 is stopped, the lateral movement motor-side gear Ga and the paper feed base-side gear Gb are, as shown in FIG. 3(C), engaged with each other on their one engagement faces 6a and 7a and no backlash naturally occurs.

On the other hand, if the paper feed base 2 is moved in the same direction as the urging force of the extension spring 5, the lateral movement motor M2 is driven from the state of FIG. 4(A) by a predetermined movement quantity in the movement direction of the paper feed base 2. Since this driving force is transmitted in a direction which does not resist the spring force of the extension spring 5 as shown in FIG. 4(B), the lateral movement motor-side gear Ga and the paper feed base-side gear Gb are engaged with each other on their other engagement faces 6b and 7b and a rotation force is thereby transmitted to the paper feed base 2. When the paper feed base 2 is stopped, the lateral movement motor-side gear Ga and the paper feed base-side gear Gb are changed to a state in which they are engaged with each other on their one engagement faces 6a and 7a, thereby preventing the occurrence of backlash.

Namely, according to the conventional case, if the paper feed base 2 is moved in the same direction as the urging direction of the extension spring 5, the paper feed base 2 is forced to be moved by the spring force of the extension spring 5 after the movement of the paper feed base 2 is stopped and the engagement state of the gears Ga and Gb is returned to an original state, thereby preventing the occurrence of backlash.

However, the movement load of the paper feed base 2 varies according to the quantity of the loaded paper. Therefore, if the movement load increases, the spring force f1 of the extension spring 5 cannot force the paper feed base 2 to be moved as shown in FIG. 4(C), with the result that backlash occurs.

Here, it is considered that an extension spring 5 having a stronger spring force is used while supposing a maximum load so as to prevent such backlash from occurring. However, if an extension spring 5 having a too strong spring force is used, it is required to change the lateral movement motor M2 to one having a strong driving force accordingly. If so, a heavy load is always exerted on the respective gears G1 to G5 and the strength, durability and the like of the gears G1 to G5 should be disadvantageously taken into account.

SUMMARY OF THE INVENTION

It is an object of the present invention to provide a backlash correction device capable of preventing the occurrence of a movement quantity error caused by the backlash of gears without increasing the urging force of urging means.

A backlash correction device according to the present invention is characterized in that a moving force from a driving source is transmitted to a mobile body through moving force transmission means having at least a gear and the mobile body is urged to one of forward and backward movement directions of the mobile body by the urging force of urging means, thereby preventing the occurrence of a movement quantity error caused by the backlash of the gear, and characterized in that (1) if the mobile body is moved in an opposite direction to an urging direction of the urging means, the driving source is controlled to be driven in a movement direction of the mobile body by a predetermined movement quantity; and (2) if the mobile body is moved in a same direction as the urging direction of the urging means, (2-1) the driving source is controlled to be driven in a movement direction of the mobile body by a movement quantity which is the sum of the predetermined movement quantity and a correction quantity equal to or greater than a maximum backlash quantity and (2-2) then driven in an opposite direction by the correction quantity.

In this backlash correction device, (1) if the mobile body is moved in an opposite direction to an urging direction of the urging means, the driving source is driven in a movement direction of the mobile body by a predetermined movement quantity. In the transmission of the driving force, the gears are engaged with each other against the urging force of the urging means and no backlash, therefore, occurs. (2) If the mobile body is moved in a same direction as the urging direction of the urging means, (2-1) the driving source is driven in a movement direction of the mobile body by a movement quantity which is the sum of the predetermined movement quantity and a correction quantity equal to or greater than a maximum backlash quantity. In the transmission of the driving force, the gears are engaged with each other in a direction which does not resist the urging force of the urging means, and there is a possibility that the gears are separated from each other, i.e., backlash occurs. However, thereafter, (2-2) the driving source is driven in an opposite direction by the correction quantity. By the movement of the driving source in the opposite direction, the gears return to a state in which they are proximate each other on predetermined engagement faces and no backlash, therefore, occurs. Thus, the occurrence of backlash is prevented without increasing the urging force of the urging means.

BRIEF DESCRIPTION OF THE DRAWINGS

FIG. 1 is a schematic plan view of a conventional feed system for a printing device or the like;

DETAILED DESCRIPTION OF THE PREFERRED EMBODIMENTS

One embodiment of the present invention will be described hereinafter with reference to the drawings.

Figure 5:
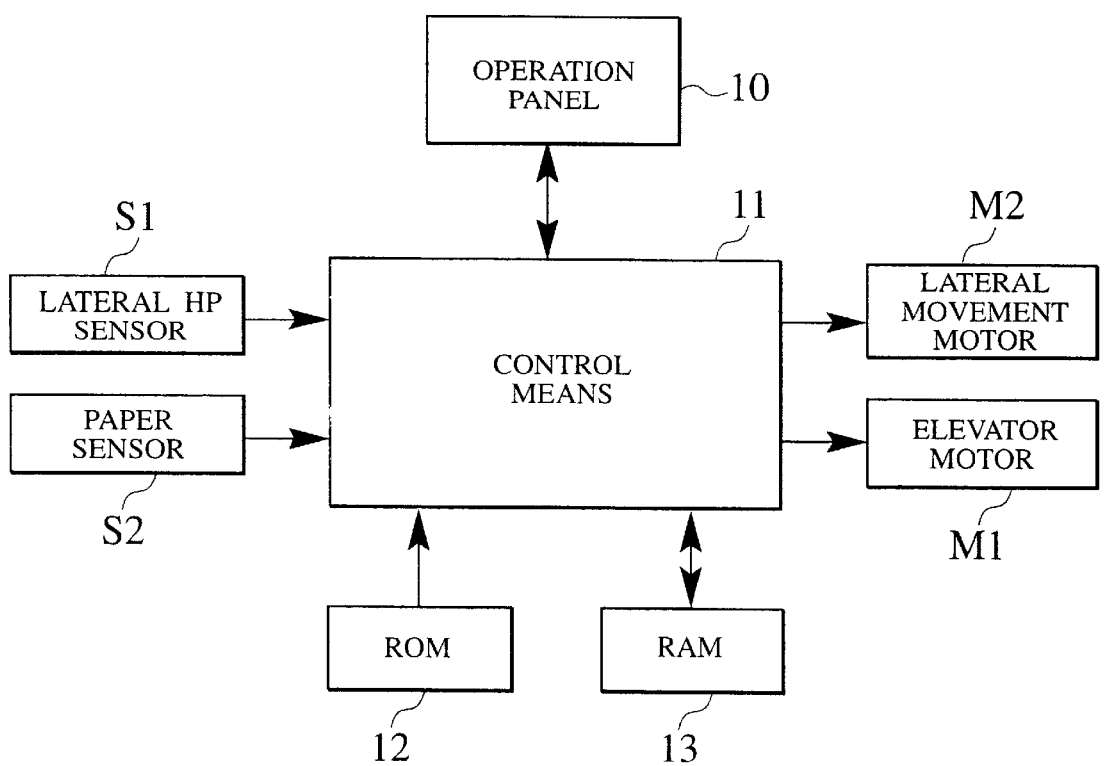
FIG. 5 shows one embodiment of the present invention, and is a schematic circuit block diagram of a paper feed device.
Figure 6:
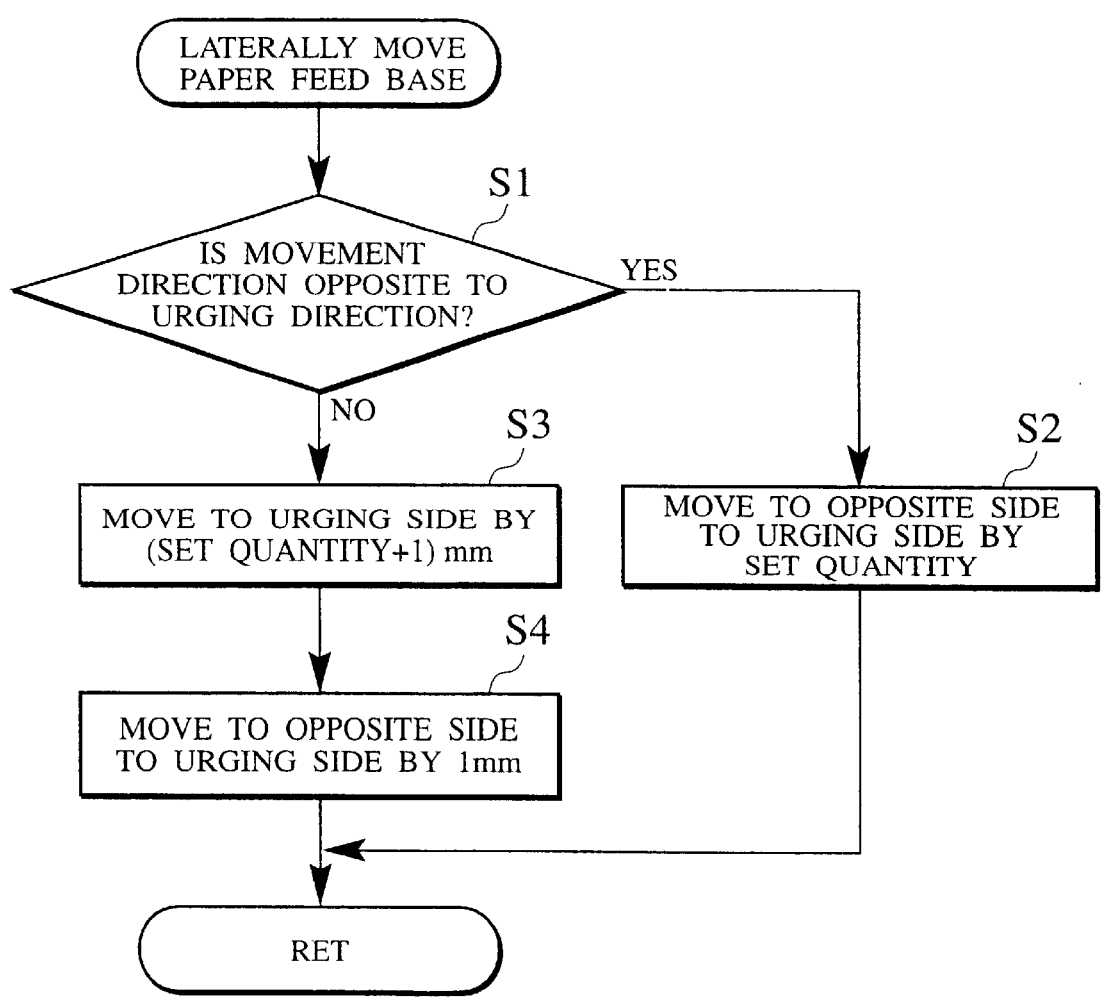
FIG. 6 shows one embodiment of the present invention, and is a flow chart for a paper feed base lateral movement mode.

FIGS. 5 to 7 show one embodiment of the present invention. In this embodiment, a backlash correction device is applied to a paper feed device as in the case of the above-stated related art. FIG. 5 is a schematic circuit block diagram of a paper feed device. FIG. 6 is a flow chart for a paper feed base lateral movement mode. FIGS. 7(A) to 7(D) are schematic diagrams each showing a gear engagement state when a paper feed base is moved in the same direction as the urging direction of an extension spring.

To compare this embodiment with the related art, mechanical constituent elements in this embodiment are made the same as those in the related art. The same constituent elements will not be described herein to avoid repetitive description and only the different constituent elements will be described. Namely, as shown in FIG. 5, an operation panel 10 has input means and display means. The input means conducts an input operation such as the selection of various modes. Input information is outputted to control means 11. The detection outputs of a lateral HP sensor S1 and a paper sensor S2 are introduced to the control means 11. Using the detection outputs, the control means 11 can recognize the reference position of a paper feed base 2 and the presence/absence of paper on the paper feed base 2. The control means 11 also controls the driving and the like of an elevator motor M1, a lateral movement motor M2. Further, the control means 11 is constituted to be capable of controlling the read and write of data from/to an ROM 12 and an RAM 13. A program for executing a flow shown in FIG. 6 and the like are stored in the ROM 12.

Figure 1:
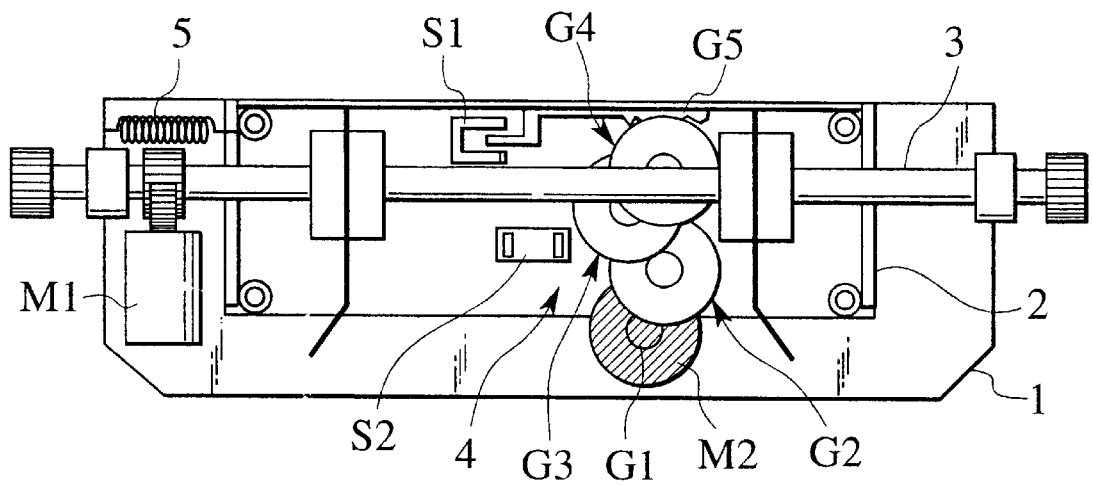
Figure 2:
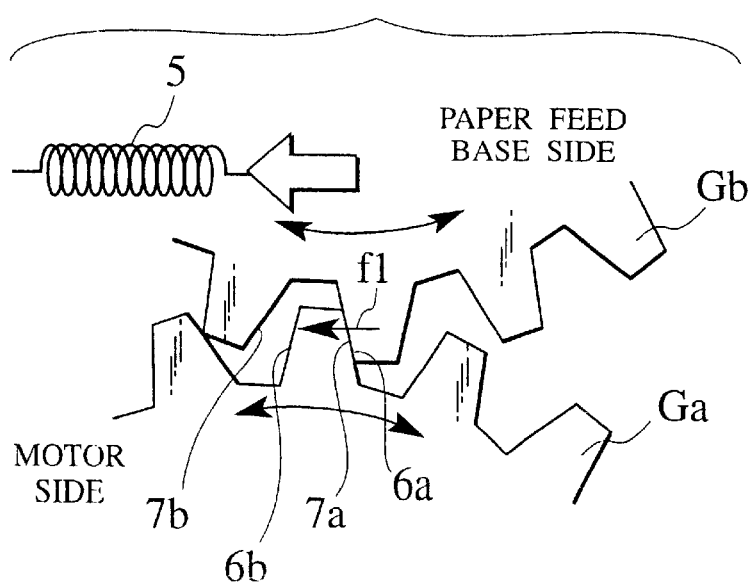
FIG. 2 is a schematic diagram showing a state in which a lateral moving motor-side gear and a paper feed base-side gear are engaged with each other.
Figure 3A:
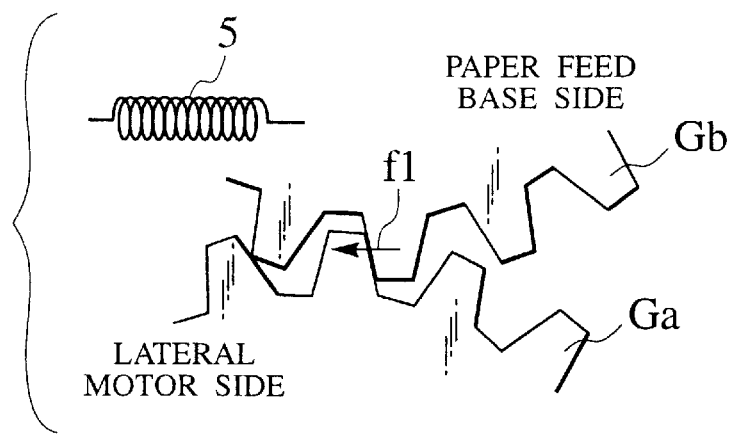
FIGS. 3(A) to 3(C) show the related art and one embodiment of the present invention, and are schematic diagrams each showing a gear engagement state when a paper feed base is moved in the opposite direction to the urging direction of an extension spring.
Figure 3B:
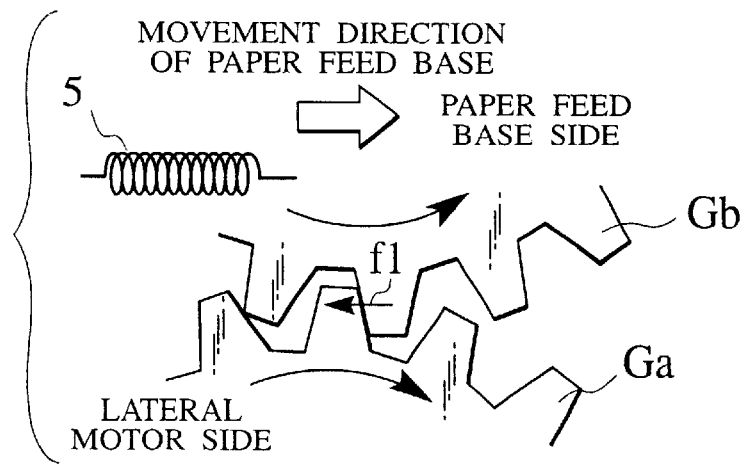
Figure 3C:
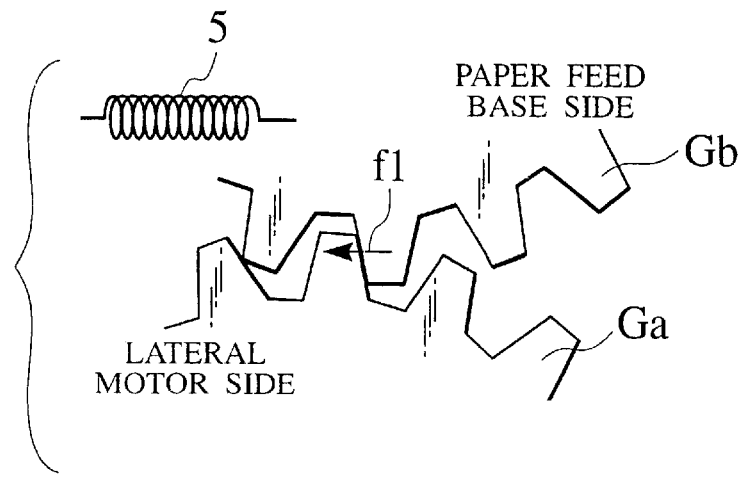
Figure 4A:
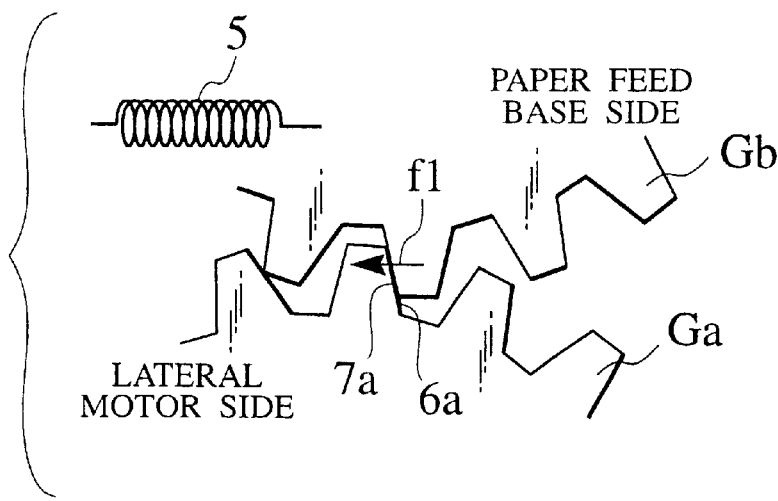
FIGS. 4(A) to 4(C) show the related art, and are schematic diagrams each showing a gear engagement state when the paper feed base is moved in the same direction as the urging direction of the extension spring.
Figure 4B:
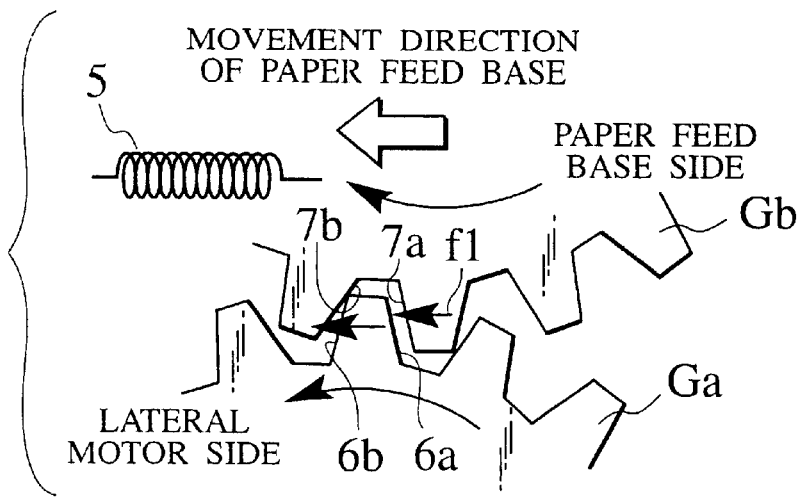
Figure 4C:
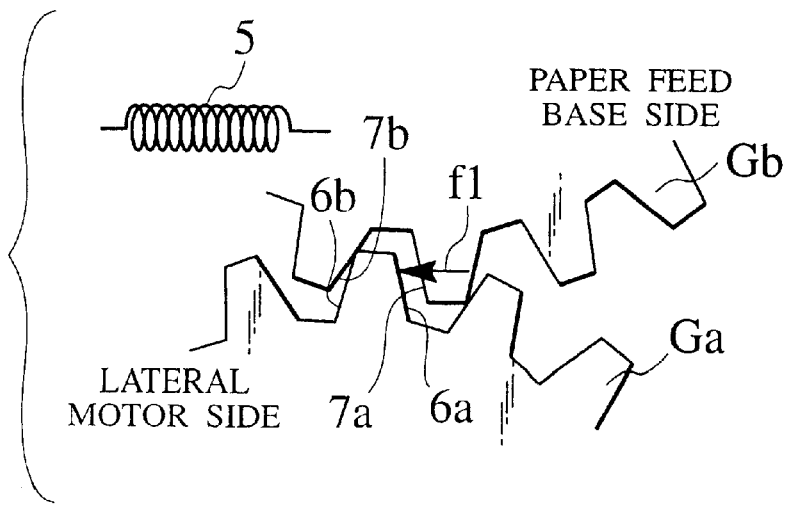

Next, the function of the paper feed device when the paper feed base is moved laterally will be described with reference to the flow chart of FIG. 6. The positional relationship among gears G1 to G5 is relatively determined. For the convenience of description, therefore, it is assumed that each motor-side gear is G1, each paper feed base-side gear is Gb. As shown in, for example, FIG. 2, the gears Ga and Gb are applied with the spring force f1 of an extension spring 5, whereby the gears Ga and Gb are always engaged with each other on their one engagement faces 6a and 7a. In this state, if the paper feed base 2 is moved in an opposite direction to the urging direction of the extension spring 5, the function is the same as that of the related art. Though already described above, the function will be described briefly for clarification purposes. Namely, the lateral movement motor M2 is driven from the state shown in FIG. 3(A) in the movement direction of the paper feed base 2 by a predetermined movement quantity (set quantity) (in steps S1 and S2). Since the driving force is transmitted in a direction which resists the spring force f1 of the extension spring 5 as shown in FIG. 3(B), the lateral movement motor-side gear Ga and the paper feed base-side gear Gb are engaged with each other on their one engagement faces 6a and 7a and a rotation force is transmitted to the paper feed base 2. Accordingly, as shown in FIG. 3(C), when the paper feed base is stopped, the lateral movement motor- side gear Ga and the paper feedbase-side gear Gb are engaged with each other on their one engagement faces 6a and 7a and no backlash naturally occurs.

Figure 7A:
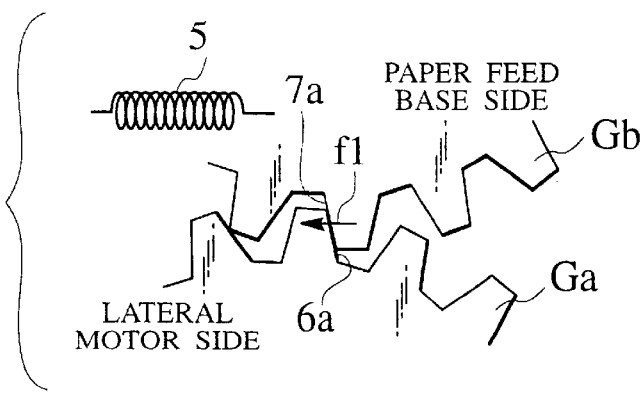
FIGS. 7(A) to 7(D) show one embodiment of the present invention, and are schematic diagrams each showing a gear engagement state when the paper feed base is moved in the same direction as the urging direction of the extension spring.
Figure 7B:
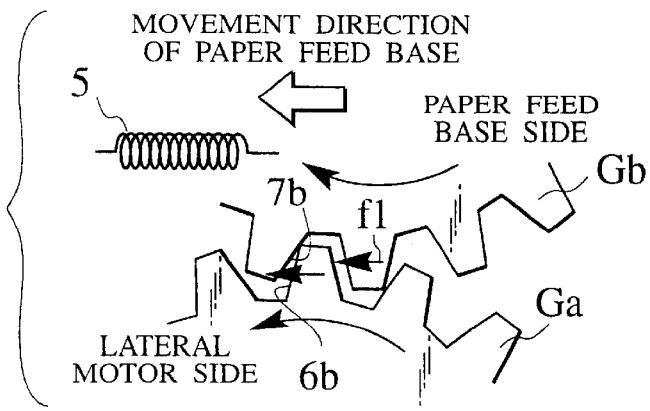
Figure 7C:
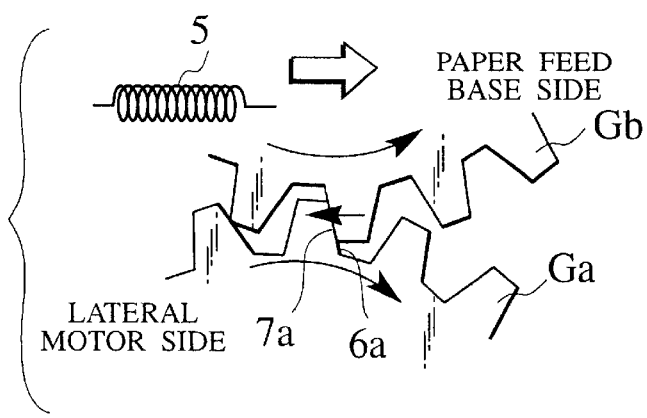
Figure 7D:
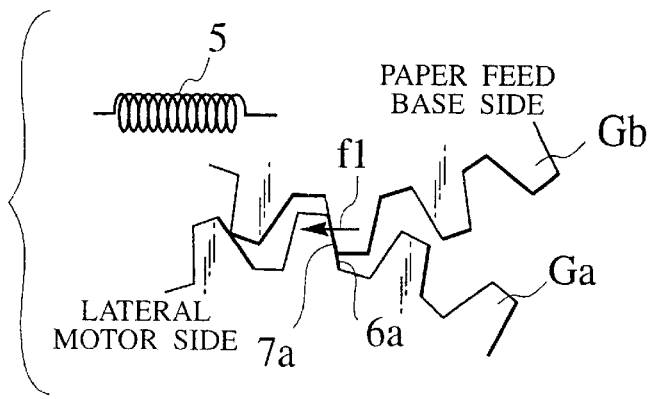

On the other hand, if the paper feed base 2 is moved in the same direction as the urging direction of the extension spring 5, the lateral movement motor M2 is driven from a state shown in FIG. 7(A) by a movement quantity which is the sum of the predetermined movement quantity (set quantity) and a correction quantity (1 mm in this embodiment) equal to or greater than a maximum backlash quantity (in steps S1 and S3). Since this driving force is transmitted in a direction which does not resist the spring force of the extension spring 5 as shown in FIG. 7(B), the lateral movement motor-side gear Ga and the paper feed base-side gear Gb are engaged with each other one their other engagement faces 6b and 7b. Thereafter, as shown in FIG. 7(C), the lateral movement motor M2 is driven in opposite direction by the correction quantity (in a step S4). By the movement of the motor M2 in opposite direction, as shown in FIG. 7(D), the gears Ga and Gb are changed to a state in which they are engaged with each other on their one engagement faces 6a and 7a and no backlash occurs. It is noted that the rotation movement quantity of the motor-side gear Ga is a predetermined movement quantity (set quantity). That is to say, the gears are returned to a state in which no backlash occurs irrespectively of whether the movement load of the paper feed base 2 is greater than the spring force of the extension spring 2. It is, therefore, possible to prevent the occurrence of an movement quantity error caused by the backlash of the gears G1 to G5 without increasing the spring force of the extension spring 5.

In the above-stated embodiment, the mobile body is the paper feed base 2, i.e., the backlash correction device and the backlash correction method of the present invention are applied to the paper feed device. It is also possible to apply the backlash correction device and the backlash correction method of the present invention to devices other than the paper feed device. If the backlash correction device and the backlash correction method of the present invention are applied to a paper feed device or the like in which the movement load of the paper feed base 2 varies according to the quantity of loaded paper, it is possible and effective to prevent the occurrence of backlash irrespectively of the quantity of paper only by setting the spring force of extension spring 5 at a minimum.

In the above-stated embodiment, the urging means is constituted out of the extension spring 5. The urging means may be arbitrary one as long as the urging means can urge the paper feed base 2 which is the mobile body, to one direction. Nevertheless, the spring such as the extension spring 5 has advantages in that the spring can be easily set to have a predetermined urging force and can be easily attached.

The above-stated embodiment shows a case where the driving force transmission means 4 is constituted out of all of the gears G1 to G5. Needless to say, it is also possible to apply the present invention to a case where only a part of transmission systems are constituted out of gears.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A backlash correction device, comprising:

a driving source;

transmission means having at least a gear, which transmit a force from said driving source to a mobile body in one of forward and backward movement directions of said mobile body;

urging means which urge said mobile body to an urging direction which is one of forward and backward movement directions of said mobile body; and control means;

wherein if said mobile body is moved in an opposite direction to the urging direction, said control means drives said driving source in a movement direction of the mobile body by a predetermined movement quantity, and if said mobile body is moved in a same direction as the urging direction of said urging means, said control means drives said driving source in a movement direction of the mobile body by a movement quantity which is a sum of the predetermined movement quantity and a correction quantity equal to or greater than a maximum backlash quantity and then drives the driving source in an opposite direction by said correction quantity, thereby preventing occurrence of a movement quantity error caused by backlash of said gear.

2. The backlash correction device according to claim 1, wherein said mobile body is a paper feed base for loading paper in a stacked state.

3. A backlash correction method for preventing occurrence of a movement quantity error caused by backlash of a gear by exerting an urging force of urging means on the mobile body to which a moving force from a driving source is transmitted through moving force transmission means having at least the gear, to one of movement directions of the mobile body, the method comprising the step of:

driving said driving source in a movement direction of the mobile body by a predetermined quantity if said mobile body is moved to an opposite direction to an urging direction of said urging means;

driving said driving source in a movement direction of the mobile body by a movement quantity which is a sum of the predetermined movement quantity and a correction quantity equal to or greater than a maximum backlash quantity, and then driving said driving source in an opposite direction by said correction quantity if said mobile body is moved in a same direction as the urging direction of said urging means.

4. The backlash correction method according to claim 3, wherein said mobile body is a paper feed base for loading paper in a stacked state.

* * * * *